United States Patent
Calarco et al.

(10) Patent No.: US 8,139,031 B2
(45) Date of Patent: Mar. 20, 2012

(54) USER CONTROLLED DEVICE FOR SENDING CONTROL SIGNALS TO AN ELECTRIC APPLIANCE, IN PARTICULAR USER CONTROLLED POINTING DEVICE SUCH AS MOUSE OR JOYSTICK, WITH 3D-MOTION DETECTION

(75) Inventors: Giuseppe Calarco, Singapore (SG); Jean Nguyen, Singapore (SG); Guy Formica, Singapore (SG); Stephane Gervais-Ducouret, Singapore (SG); Fabio Pasolini, S. Martino Siccomario (IL); Paolo Bendiscioli, Pavia (IL)

(73) Assignees: STMicroelectronics S.r.l., Agrate Brianza (IT); STMicroelectronics Asia Pacific Pte Ltd., Singapore (SG)

( * ) Notice: Subject to any disclaimer, the term of this patent is extended or adjusted under 35 U.S.C. 154(b) by 1530 days.

(21) Appl. No.: 10/685,292

(22) Filed: Oct. 14, 2003

(65) Prior Publication Data
US 2004/0227725 A1 Nov. 18, 2004

(30) Foreign Application Priority Data
Oct. 14, 2002 (EP) ................................. 02425626.5

(51) Int. Cl.
*G09G 5/08* (2006.01)

(52) U.S. Cl. ........................................ 345/163; 345/158

(58) Field of Classification Search ........... 345/156–184
See application file for complete search history.

(56) References Cited

U.S. PATENT DOCUMENTS

| 4,565,999 | A | * | 1/1986 | King et al. | .................... | 345/158 |
|---|---|---|---|---|---|---|
| 4,682,159 | A | * | 7/1987 | Davison | ........................ | 345/158 |
| 4,787,051 | A | | 11/1988 | Olson | .......................... | 364/518 |
| 5,181,181 | A | * | 1/1993 | Glynn | .......................... | 702/141 |
| 5,615,132 | A | * | 3/1997 | Horton et al. | .................... | 703/7 |
| 5,638,092 | A | | 6/1997 | Eng et al. | ....................... | 345/158 |
| 5,701,131 | A | * | 12/1997 | Kuga | ............................ | 345/156 |
| 5,703,623 | A | * | 12/1997 | Hall et al. | ..................... | 345/158 |
| 6,130,664 | A | | 10/2000 | Suzuki | ........................ | 345/158 |
| 6,249,274 | B1 | * | 6/2001 | Svancarek et al. | ............ | 345/158 |
| 6,573,883 | B1 | * | 6/2003 | Bartlett | ........................ | 345/156 |

(Continued)

FOREIGN PATENT DOCUMENTS

EP 0166432 1/1986

(Continued)

OTHER PUBLICATIONS

Hinckley, K. et al., "The VideoMouse: A Camera-Based Multi-Degree-of-Freedom Input Device," in *Proceedings of the ACM UIST '99 Symposium on User Interface Software & Technology*, CHI Letters *1*(1):103-112, 1999.

(Continued)

*Primary Examiner* — Regina Liang
(74) *Attorney, Agent, or Firm* — Seed IP Law Group PLLC (57) ABSTRACT

A user controlled device, movable into a plurality of positions of a three-dimensional space, includes a MEMS acceleration sensor to detect 3D movements of the user controlled device. The device, such as a mouse, sends control signals correlated to the detected positions to an electrical appliance, such as a computer system. A microcontroller processes the output signals of the MEMS acceleration sensor to generate the control signals, such as screen pointer position signals and "clicking" functions.

46 Claims, 4 Drawing Sheets

U.S. PATENT DOCUMENTS

| | | | |
|---|---|---|---|
| 6,765,553 B1 * | 7/2004 | Odamura | 345/156 |
| 6,834,249 B2 * | 12/2004 | Orchard | |
| 6,933,933 B2 * | 8/2005 | Fleming | 345/179 |
| 2001/0055951 A1 | 12/2001 | Slotznick | 455/41 |
| 2002/0065626 A1 | 5/2002 | McCall et al. | 702/141 |
| 2004/0066371 A1 * | 4/2004 | Huang | 345/163 |

FOREIGN PATENT DOCUMENTS

| | | |
|---|---|---|
| EP | 0901064 A2 | 3/1999 |
| WO | WO 01/90877 A1 | 11/2001 |
| WO | WO 02/37827 A2 | 5/2002 |

OTHER PUBLICATIONS

Lee, S., et al. "Two-Dimensional Position Detection System with MEMS Accelerometer for MOUSE Applications," *Proceedings of the Design Automation Conference*, vol. 38, Jun. 18, 2001, pp. 852-857.

* cited by examiner

USER CONTROLLED DEVICE FOR SENDING CONTROL SIGNALS TO AN ELECTRIC APPLIANCE, IN PARTICULAR USER CONTROLLED POINTING DEVICE SUCH AS MOUSE OR JOYSTICK, WITH 3D-MOTION DETECTION

BACKGROUND OF THE INVENTION

1. Field of the Invention

The present invention relates to a user-controlled device, in particular a mouse or a joystick, with 3D motion detection. The invention is however also applicable to game pads, trackballs and other screen pointing devices for a computer system as well as to devices for pointing or selecting predetermined tasks or information according to their position, which are connected to a computer or a computer-controlled system. The invention is also applicable to the control of an electrical appliance, e.g., for switching on an electrical appliance and activate particular tasks, on the base of a 3D movement signal generated by the user-controlled device.

2. Description of the Related Art

As is known, mice are now the most common interface between a person and a computer or a computer controlled device and are hand-displaced on a plane or two-dimensional surface to control a cursor or pointer or activate particular tasks. To this end, typical mice comprise a plurality of sensors detecting a 2D movement of the mouse; a plurality of buttons for entering commands and a communication interface for communication with the computer system.

In view of the ease of operation and spread in use of mice as a convenient interface with computer systems, a number of functionalities are being developed to make mice still easier to use, to reduce operation stresses and damages to arms and shoulders, to increase the number of tasks that may be controlled or selected through a mouse, to adapt to various specific requirement and operation environment or to detect movements with more degrees of freedom.

For example, a mouse has been proposed, having improved movement detection capabilities, including detection of tilting in four different directions, rotation about its axis and a little vertical movement. This mouse, described, e.g., in "The VideoMouse: A Camera-Based Multi-Degree-of-Freedom Input Device," by K. Hinckley et al., ACM UIST'99 Symposium on User Interface Software & Technology, *CHI Letters* 1 (1), pp. 103-112, uses a video camera for detecting the movement. However, although the image processing systems are becoming cheaper and smaller, the costs and dimensions of these systems do not allow their use in all systems. Furthermore, this type of movement detection has a functionality highly dependent upon light conditions and/or optical features of the surface the mouse rests on.

Furthermore, the known solutions do not always allow operation by disabled persons, having limited or no hand control.

BRIEF SUMMARY OF THE INVENTION

An embodiment of the invention improves a user controlled device of the indicated type, so as to allow a wider applicability.

According to various embodiments of the present invention, there is provided a user controlled device, and a method for generating control signals.

According to an aspect of the invention, the user controlled device accommodates an accelerometer or acceleration sensor made with the MEMS (MicroElectroMechanicalSystem) technology and able to detect 3D movements, in particular movements around two perpendicular axes, so as to sense the movement of the user controlled device in the space and send corresponding control signals to an electrical appliance, e.g., a computer system.

According to a first embodiment, the user controlled device is similar to a conventional mouse with buttons, wheels and click possibilities, but instead of being configured so as to be displaceable in a plane, has a support allowing tilting of the device around two perpendicular axes. The support may allow a vertical displacement of the device body.

According to another embodiment, the user-controlled device is an aid device for disabled individuals, in particular for persons having a reduced residual mobility and can, e.g., only move the head. The control device has a housing accommodating a dual-axis MEMS accelerometer operating as an inclinometer; the housing is worn by the person and fixed to a mobile limb or head. For example, the housing may be similar to the housings used for hearing aids, and may be supported in the eyeglass arm, or be fixed to the head through a hairband.

According to another aspect of the invention, the control device is connected through a wire or in a wireless way to the computer system.

BRIEF DESCRIPTION OF THE SEVERAL VIEWS OF THE DRAWINGS

For the understanding of the present invention, preferred embodiments thereof are now described, purely as a non-limitative examples, with reference to the enclosed drawings, wherein.

DETAILED DESCRIPTION OF THE INVENTION

Figure 1:
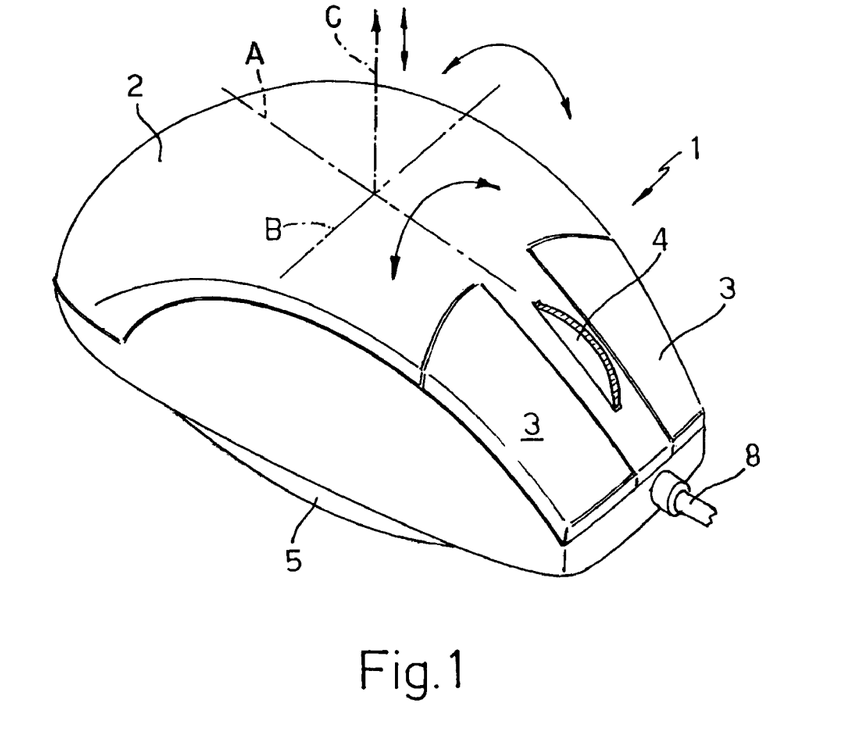
FIG. 1 shows a perspective view of a first embodiment of the present control device.

FIG. 1 shows a first embodiment of the present control device, in the shape of a mouse 1. The mouse 1 comprises a body 2 of rounded shape having two buttons 3 and a central wheel 4 operable by the user, in a per se known manner. In the alternative, a middle button may be provided instead of the wheel.

Figure 2:
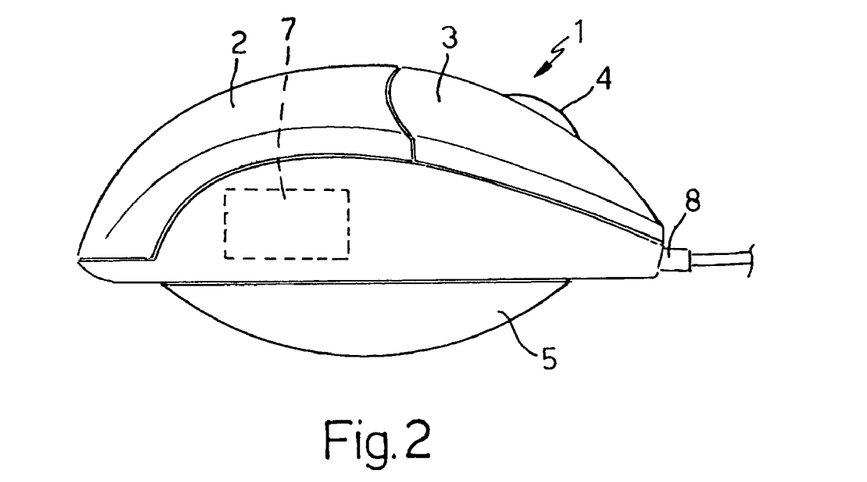
FIG. 2 is a lateral view of the pointing device of FIG. 1.

The body 2 is supported by a curved base 5 preferably in the shape of a spherical cap arranged with the convexity looking downwards, so as to allow tilting of the body 2 around two axes A and B, perpendicular to each other and to a vertical axis C. The curved base 5 may be of rigid or resilient material (e.g., rubber), to allow a vertical displacement of the body 2.

Figure 8:
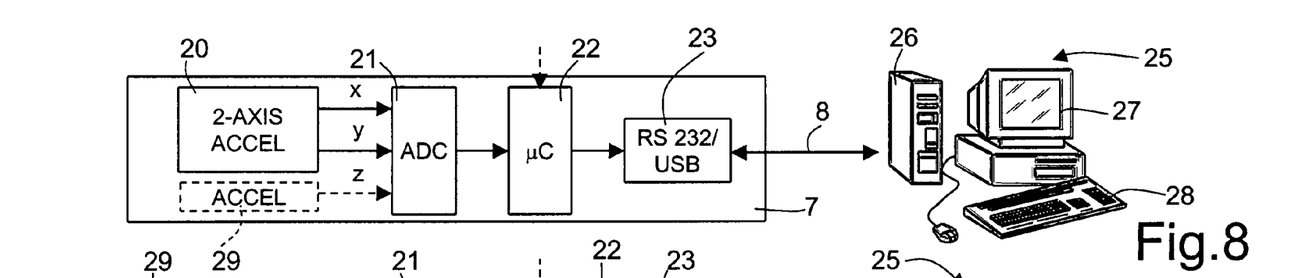
FIG. 8 is a block diagram of the pointing device of FIGS. 1-7.
Figure 9:
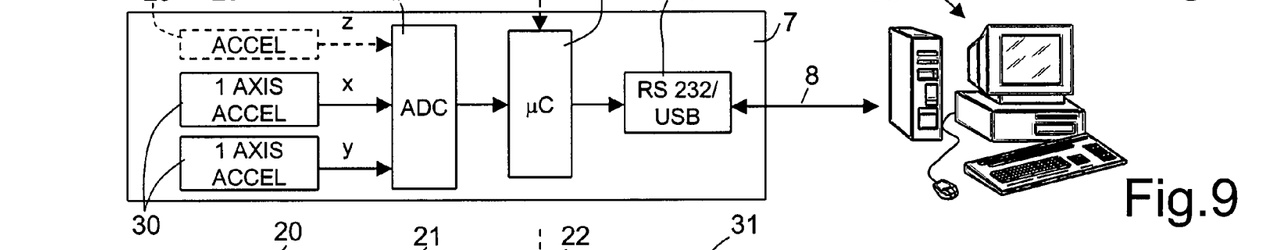
FIG. 9 is a different block diagram of the control device of FIGS. 1-7.

The body 2 accommodates the usual control circuitry (not shown), for detecting actuation of the buttons 3 ("clicking") and rotation of the wheel 4 in a per se known manner and sending suitable signals to a computer system (see FIGS. 7-9). Furthermore, the body 2 accommodates a 3D-motion detection device 7 (the block diagram whereof is shown in FIGS. 7-9) based on a MEMS accelerometer detecting the acceleration and movement of the body, in particular the tilting of the body 2 around axes A and B and in case vertical displacement along the axis C and sending corresponding information or control signals toward the computer system. The transmission circuitry may be in common with the usual button and wheel control circuitry.

In the shown embodiment, an electrical wire 8 connects the mouse 1 with the computer system; in the alternative and in a per se known manner, the mouse 1 may be connected wireless (e.g., by optical or radio transmission) to the computer system.

The mouse 1 is designed to be balanced and to rest in an horizontal position in the absence of external forces and to tilt around axis B (up-down movement of the front portion bearing the buttons 3 and the wheel 4) and/or around axis A (left-right movement) under the pressure of a user's hand. The 3D-motion detection device 7 (as discussed in detail with reference to FIGS. 7-9) detects the tilting and in case the vertical displacement and generates corresponding signals to control an arrow on a screen of the computer system. In particular, the left-right mouse movement (around axis A) may cause a corresponding left-right movement of an arrow on the screen; the up-down mouse movement (around axis B) may cause a corresponding up and down movement on the screen; the vertical movement may control further functions, for example for handling more folders on the screen or performing other pre-programmed dedicated tasks.

Figures 3, 4:
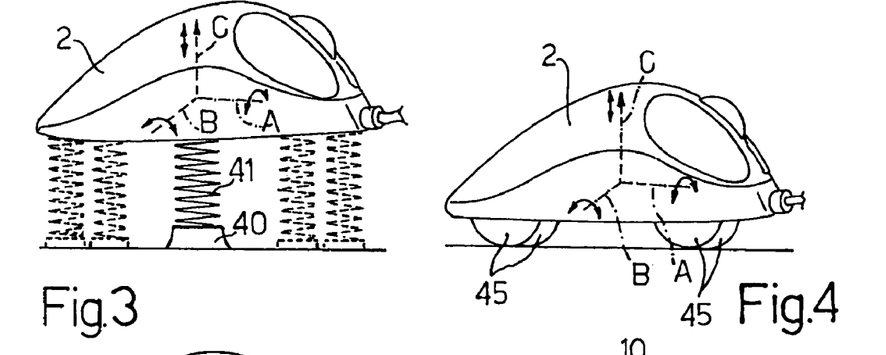
FIG. 3 shows a perspective view of a second embodiment of the present control device.
FIG. 4 shows a perspective view of a third embodiment of the control device.

FIG. 3 shows a different embodiment, wherein the body 2 is supported by a suction cap 40 and a spring 41 is interposed between the suction cap 40 and the body 2. By virtue of the spring 41, the body 2 may be tilted around axes A and B and be displaced along axis C, and a 3D-motion detection device (not shown) arranged inside the body 2 sends corresponding control signals to a computer system. In the alternative, more springs, e.g., four springs, may be provided for a better tilting control, as schematically represented by dashed lines.

FIG. 4 shows another embodiment, wherein the body 2 is supported by four balls 45, e.g., of rubber. Also here, the body 2 may perform a tilting movement around axes A, B and vertical displacement along vertical axis C, and a 3D-motion detection device (not shown) arranged inside the body 2 sends corresponding control signals to a computer system.

Figures 5, 6, 7:
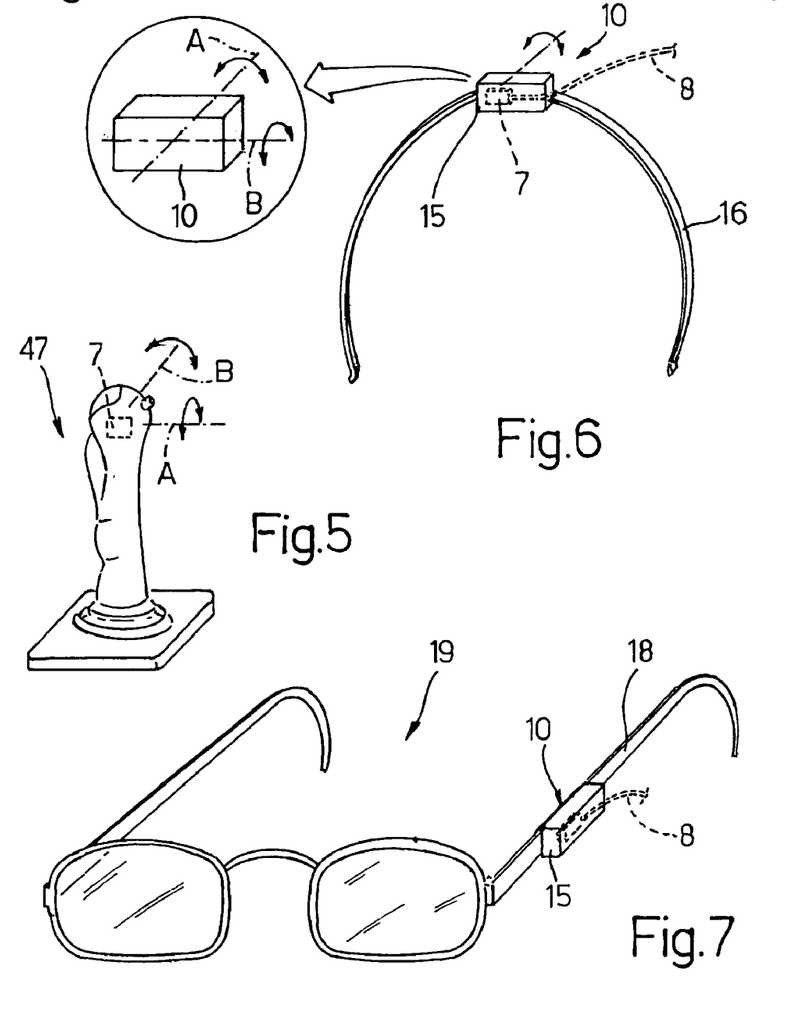
FIG. 5 shows a perspective view of a fourth embodiment of the control device.
FIG. 6 shows a perspective view of a fifth embodiment of the control device.
FIG. 7 shows a perspective view of a sixth embodiment of the control device.

FIG. 5 shows another embodiment, wherein the control device is a joystick 47, having usual buttons for function control and accommodating a 3D-motion detection device 7.

FIGS. 6 and 7 show different embodiments specifically intended for disabled persons. In this case, a pointing device 10 includes a housing 15 fixedly attached to an article worn by the user.

In FIG. 6, the housing 15 is attached to a hairband 16 and accommodates the 3D-motion detection device 7, shown with dashed lines; the pointing device may be connected to the computer system through a wire 8 or, preferably, in a wireless way.

In FIG. 7, the housing 15 is attached to an arm 18 of a pair of glasses 19.

In both cases, tilting of the head of a user up-down and/or left-right causes tilting of the pointing device around axes A, B, as visible in the enlarged detail of FIG. 6, and sending of corresponding signals to the computer system, analogously to the embodiments of FIGS. 1-5. In addition, the pointing device 10 may be designed to associate specific movements of the housing 15 to "click" functions, as below described in greater detail with reference to the flow-chart of FIG. 11.

A first embodiment of the 3D-motion detection device 7 is shown in FIG. 8. Here, the 3D-motion detection device 7 includes a 2-axis accelerometer 20 manufactured in the MEMS technology, for example as described in European patent application N. 02425320.5 filed on 21 May 2002. Accelerometer 20 generates two output signals X, Y proportional to the tilting angle of the mouse 1 or of the pointing device 10 around axes A, B. Output signals X, Y are digitized in an analog-to-digital converter 21 and fed to a microcontroller 22. Microcontroller 22 may also receive further control signals, such as "clicking" signals from the buttons 3 and position signals from the wheel 4 in the embodiments of FIGS. 1-5, as indicated with dashed line.

The 3D-motion detection device 7 also includes a communication port 23, for example, an RS 232 or USB port for signal exchange between the microcontroller 22 and a computer 25 including, i.e., a central unit 26, a screen 27 and a keyboard 28.

In case of the mouse 1 or the pointing device 10 allow vertical displacement, a further accelerometer 29 may be provided to send a corresponding signal to AD converter 21 and microcontroller 22, as shown in dashed line.

FIG. 9 shows a second embodiment of the 3D-motion detection device 7 comprising, instead of a 2-axis accelerometer, two 1-axis accelerometers 30 and, in case, a vertical axis accelerometer 29, all manufactured in the MEMS technology. For example, the accelerometer described in U.S. application Ser. No. 10/128,133 filed on Apr. 23, 2002 or the accelerometer described in U.S. Pat. No. 5,955,668 may be used. In this case, the accelerometers 30 are arranged so that one accelerometer 30 detects tilting around axis A and the other accelerometer 30 detects tilting around axis B, while accelerometer 29 detect displacement along axis C, and generate respective output signals X, Y and Z.

Figure 10:
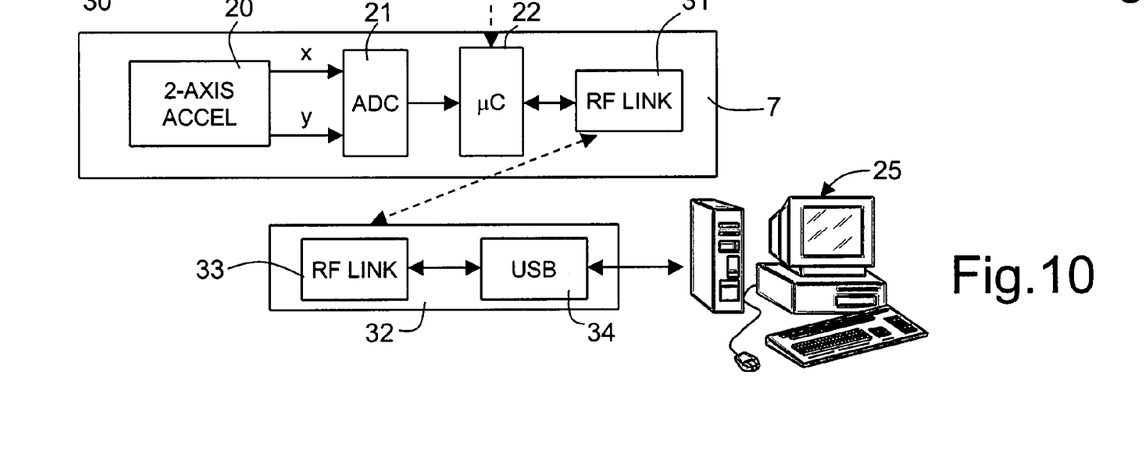
FIG. 10 is another block diagram of the control device of FIGS. 1-7.

FIG. 10 shows a third embodiment including a 2-axis accelerometer 20 as in FIG. 8, but communication with the computer 25 is accomplished through a radio-frequency link (e.g., using the Bluetooth technology). Here, the microcontroller 22 is connected with an RF transmitter/receiver 31 which, through antennas not shown, communicates with an interface 32 including an analogous RF transmitter/receiver 33 and a digital port 34, e.g., an RS 232 or USB port, in turn connected with the computer 25.

In the case of the mouse 1, the 3D-motion detection device 7 detects the tilting movements of the body 2 and controls the position of an arrow or other pointer on the screen 27 on the basis of the output signals X and Y fed by the 2-axis accelerometer 20 or the 1-axis accelerometers 30 in a manner analogous to conventional mice.

In case of vertical displacement, signal Z may be used according to the pre-programmed task.

In case of the pointing device 10, as said, the microcontroller 22 may control not only the shifting of an arrow on the screen 27, but also "clicking" functions, based, e.g., on the variation speed, i.e., the rate of change, of the output signals X, Y fed by the accelerometer(s) 20, 30. Conveniently, the microcontroller 22 is able to discriminate among unintentional small movements (e.g., tremors) of the user's head, intentional movements of bigger entity for pointer position control and rapid head movements for "clicking."

To this end, the microcontroller compares the entity of the detected movements (difference between the current and previous output signals X and Y, fed by the accelerometer) with a click threshold to detect a clicking movement, and, if a clicking movement is not detected, the microcontroller compares the signals X and Y with respective thresholds THX and THY to detect arrow control movements.

In particular, when an arrow control movement is detected (slow movement of the head), the signs of the signals indicate the direction (up, down, left, right) of the arrow movement with a speed which is a function of the amplitude of the signals. When instead a clicking function is detected, the sign of the derivative of one output signal indicates simple clicking of the left or of the right button, and the sign of the derivative of the other output signal indicates continuous pressure of the left button or interruption of the continuous pressure, as below described in detail.

The thresholds may be programmed by the user in a setup phase of the pointing device 10, as well as the functions associated with slow or rapid movement.

Figure 11:
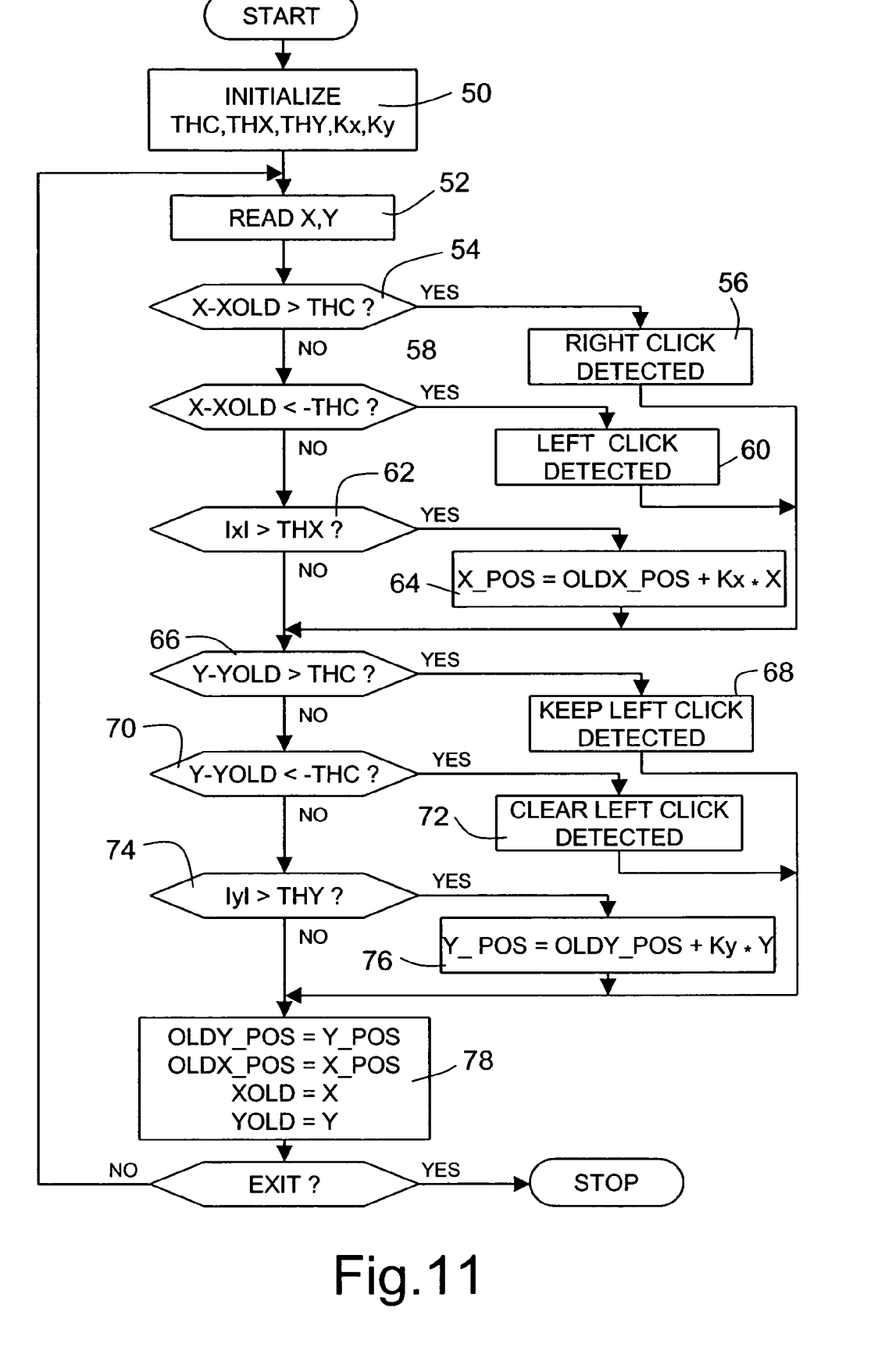
FIG. 11 is flow-chart of the operation of the pointing device of FIG. 6 or 7.

A flow-chart of the control program of the microcontroller 22 for the embodiments of FIG. 6, 7 is shown in FIG. 11.

Initially, step 50, thresholds THC, THX, THY, and constants Kx, Ky are initialized. Threshold THC represents the clicking threshold, that is the minimum derivative in absolute value for controlling a clicking function; THX represents the X-signal threshold, that is the minimum signal in absolute value for recognizing a valid movement along the X axis and THY represents the Y-signal threshold, that is the minimum signal in absolute value for recognizing a valid movement along the Y axis. Kx and Ky represent the desired movement speed.

Then, the (digitized) output signals X and Y from the accelerometer(s) 20, 30 are read, step 52; the entity of the movement in the X direction is calculated as the difference between the output signal X and a previous value XOLD, and represents the amount of change of position in the X direction since the previous value XOLD was read. The resulting value is compared with positive clicking threshold THC, step 54. If the difference X-XOLD is higher than the positive clicking threshold THC, indicating a rate of change that exceeds the threshold THC, a right click (corresponding to clicking of the right button in a conventional mouse) is detected and a corresponding signal is sent to the computer system, step 56; otherwise the difference X-XOLD is compared with the negative clicking threshold −THC, step 58. If the difference X-XOLD is lower than the negative clicking threshold −THC, a left click (corresponding to clicking of the left button in a conventional mouse) is detected and a corresponding signal is sent to the computer system, step 60.

If the difference X-XOLD is higher than negative clicking threshold −THC but lower than positive clicking threshold THC, output NO from step 58, the absolute value of the signal X is compared with X-signal threshold THX to discriminate between an unintentional small movement and a control movement, step 62. If the absolute value of the signal X is higher than X-signal threshold THX, a new position X_POS of the mouse on the screen is calculated by adding a quantity Kx*X, proportional to the detected output signal X, to the previous position OLDX_POS and a corresponding signal is sent to the computer system, step 64.

If the absolute value of the signal X is lower than the X-signal threshold THX (output NO from step 62), as well as after detecting a clicking function (after steps 56, 60) and after calculating the new position X_POS (after step 64), the variation of the output signal Y is checked, analogously to what has been described for the X signal. Thus, the entity of the movement in the Y direction is calculated as the difference between the output signal Y and a previous value YOLD and compared with positive clicking threshold THC, step 66. If the difference Y-YOLD is higher than the positive clicking threshold THC, a command analogous to the continuous pressure of the left button in a conventional mouse is detected and a corresponding signal is sent to the computer system, step 68; otherwise the difference Y-YOLD is compared with the negative clicking threshold −THC, step 70. If the difference Y-YOLD is lower than the negative clicking threshold −THC, a release command of the left button is detected and a corresponding signal is sent to the computer system, step 72.

If the difference Y-YOLD is higher than negative clicking threshold −THC but lower than positive clicking threshold THC, output NO from step 70, the absolute value of the signal Y is compared with Y-signal threshold THY, step 74. If the absolute value of the signal Y is higher than Y-signal threshold THY, a new position Y_POS of the mouse on the screen is calculated by adding a quantity Ky*Y, proportional to the detected output signal Y, to a previous position value OLDY_POS and a corresponding signal is sent to the computer system, step 76.

If the signal Y is lower than the Y-signal threshold THY (output NO from step 74), as well as after detecting a continuous clicking or clicking release function (after steps 68, 72) and after calculating the new position Y_POS (after step 76), the previous values XOLD, YOLD, OLDX_POS and OLDY_POS are updated with the current values X, Y, X_POS and Y_POS, step 78.

The cycle continues until the pointing device is switched off.

The advantages of the present invention are clear from the above. In particular, it is outlined that the detection of a 3D movement by way of an MEMS accelerometer causes the control device to be very versatile as regards application, features and operativity. In particular, the control device may be implemented as a mouse, joystick, trackball, control pad or other control device for a screen cursor or for selection among a number of alternatives presented on a screen or other display. The device may be implemented to allow a simple actuation, also by persons having reduced movement capabilities; and additional control may be implemented by a same control device.

Furthermore, the implementation as a mouse requires an actuation space smaller than the actual mice, since no planar movement on a resting surface is required. Furthermore, no mouse pad is needed, and the present pointing device may be actuated on top of any surface, independently from the texture or optical properties thereof.

The control device with 3D-movement detection by MEMS accelerometers manufactured using semiconductor technologies is cheaper than other prior solutions.

The device may be used to control actuation of different operations or tasks of an electrical appliance, which is very advantageous for disabled persons or in case that the user should require the hands free for other activities.

Finally, it is clear that numerous variations and modifications may be made to pointing, selection or, generally, control device described and illustrated herein, all falling within the scope of the invention as defined in the attached claims.

In particular, the pointing, selection or control device may be implemented in any support, such as any mouse, joystick, gamepad, PDA (personal digital assistant, allowing Web surfing, e-mail exchange and so on), mobile phone, that is 3D-movable or has a 3D-movable portion.

Furthermore, the shape of the support allowing tilting of the device body may vary; for example, in the embodiment of FIG. 4, the yieldable balls may be replaced by rigid balls connected to the body 2 through elastic means.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The invention claimed is:

1. A user controlled device, comprising:
    a body that is movable into a plurality of positions of a three-dimensional space;
    a MEMS acceleration sensor coupled to the body and configured to detect movements of said body in first and second directions; and
    a microcontroller coupled to the MEMS acceleration sensor and configured to generate first control signals correlated to said positions, only while detected movements of said body are less than a speed of movement threshold and greater than an amplitude of movement threshold.

2. A device according to claim 1 wherein said body is in a form selected between computer mouse, joystick, gamepad, and PDA.

3. A device according to claim 1 wherein said body is supported so as to be tiltable around two axes.

4. A device according to claim 3 wherein said body 2 is mouse-shaped and is supported by one of the following: rounded base, at least one spring, yieldable balls, or elastically supported balls.

5. A device according to claim 1 wherein the body is a housing accommodating said MEMS acceleration sensor and fixed to an article to be worn by the user.

6. A device according to claim 5 wherein said article is configured to be borne by the user's head.

7. A device according to claim 6 wherein said article is selected between a hairband and eyeglasses.

8. A device according to claim 1 wherein said MEMS acceleration sensor comprises at least a two-axis accelerometer or two one-axis accelerometers.

9. A device according to claim 1, further comprising transmission means for connecting said microcontroller to an electrical appliance, said transmission means including a wire transmissive medium and a communication port.

10. A device according to claim 1, further comprising transmission means for connecting said microcontroller to an electrical appliance, said transmission means including an RF communication port for allowing wireless communication with said electrical appliance.

11. A device according to claim 1 wherein said first control signals comprise a control signal for displacing a screen pointer along a first direction upon detection of movement of said device in said first direction and a control signal for displacing said screen pointer along a second direction upon detection of movement of said device in said second direction.

12. A device according to claim 1 wherein said microcontroller comprises means for generating second control signals upon detecting movements of said device that are greater than said speed of movement threshold.

13. A device according to claim 12 wherein said second control signals comprise control signals for activating functions that include clicking; continuous clicking; and continuous clicking release functions.

14. The device of claim 1 wherein the first and second directions are axes of rotation.

15. The device of claim 1 wherein the MEMS acceleration sensor is configured to detect movements of said device in a third direction.

16. The device of claim 15 wherein the third direction is vertical displacement.

17. A method for generating control signals correlated to positions of a user controlled device, comprising:
    moving the user controlled device into one of a plurality of positions of a three-dimensional space;
    detecting movements of said device through a MEMS acceleration sensor;
    deriving a rate of change of position and an amplitude of position from the detected movements of said device;
    comparing the rate of change with a speed threshold;
    sending function activation signals to an electrical appliance corresponding to an axis of movement of the device when the derived rate of change exceeds the speed threshold;
    comparing the amplitude of movement with an amplitude threshold; and
    sending pointer control signals to the electrical appliance corresponding to the axis and amplitude of position of the device only when the amplitude of position exceeds the amplitude threshold but the rate of change does not exceed the speed threshold.

18. A method according to claim 17 wherein the detecting step comprises detecting tilting movements of a body accommodating said MEMS acceleration sensor around two axes.

19. A method according to claim 17 comprising generating position signals corresponding to movements of said device along respective directions, and wherein said position signals are processed to generate said control signals.

20. A method according to claim 19 wherein said control signals comprise displacing signals for displacing a screen pointer along two directions.

21. A method according claim 19 wherein said function activation signals comprise clicking, continuous clicking, and continuous clicking release functions.

22. The method of claim 17 wherein the first threshold comprises a first X axis threshold and a first Y axis threshold.

23. The method of claim 17 wherein the second threshold comprises a second X axis threshold and a second Y axis threshold.

24. A method, comprising:
    employing a MEMS sensor to detect movement of a body in a three-dimensional space;
    producing movement signals corresponding to the movement of the body; and
    producing control signals corresponding to the movement signals, and suitable for moving a pointer on a computer screen, provided the movement of the body does not exceed a speed threshold.

25. The method of claim 24 wherein the producing control signals step includes ignoring movement signals that do not exceed an amplitude threshold.

26. The method of claim 24, further comprising producing function activation signals corresponding to movement of the body that exceeds the speed threshold.

27. The method of claim 24 wherein the movement signals include a first movement signal corresponding to a movement of the body in a first direction and a second movement signal corresponding to a movement of the body in a second direction, and wherein the control signals include a first control signal corresponding to the first movement signal and a second control signal corresponding to a second control signal.

28. The method of claim 27 wherein the first control signal is suitable for moving the pointer in a first pointer direction and the second control signal is suitable for moving the pointer in a second pointer direction.

29. The method of claim 24, further comprising:
coupling the body to a user's head; and
moving the body by moving the user's head.

30. A system, comprising:
a computer screen;
a CPU coupled to the computer screen;
a pointing device coupled to the CPU;
a MEMS sensor coupled to the pointing device, the MEMS sensor configured to produce position signals corresponding to movement of the pointing device; and
a microprocessor coupled to the MEMS sensor, configured to compare a rate of movement of the pointing device to a threshold and, only if the rate of movement of the pointing device does not exceed the threshold, convert the position signals of the MEMS sensor to control signals suitable for controlling position of a pointer on the computer screen.

31. The system of claim 30 wherein the MEMS sensor is configured to produce position signals corresponding to movement of the pointing device around first and second mutually perpendicular axes.

32. The system of claim 30 wherein the microprocessor is configured to produce a function activation signal when the rate of movement of the pointing device exceeds the threshold.

33. The system of claim 32 wherein the function activation signal is a click signal.

34. The system of claim 32 wherein the microprocessor is further configured to control a speed of movement of the pointer in accordance with a movement amplitude of the pointing device.

35. A device comprising:
a body;
a sensor coupled to the body and configured to produce a first signal corresponding to rotation of the body around a first axis; and
a circuit configured to produce a cursor movement command in a first direction, corresponding to a value of the first signal, only when the first signal indicates rotation of the body that is lower than a speed threshold, and to produce a first function command when the first signal indicates rotation of the body that exceeds the speed threshold.

36. The device of claim 35 wherein the first function command is a mouse click command.

37. The device of claim 35 wherein the circuit is configured to produce the first function command when the first signal indicates rotation of the body in a first direction exceeding the speed threshold, and to produce a second function command when the first signal indicates rotation of the body in a second direction exceeding the speed threshold.

38. The device of claim 37 wherein the first function command is a left mouse click command and the second function command is a right mouse click command.

39. The device of claim 35 wherein the circuit is configured to produce the cursor movement command only when the first signal indicates rotation of the body exceeding an amplitude threshold.

40. The device of claim 39 wherein the speed and amplitude thresholds are selectable by a user of the device.

41. The device of claim 35 wherein the sensor is further configured to produce a second signal corresponding to rotation of the body around a second axis perpendicular to the first axis, and the circuit is further configured to produce a second function command when the second signal indicates rotation of the body around the second axis exceeding a respective speed threshold.

42. The device of claim 41 wherein the sensor is further configured to produce a third signal corresponding to movement of the body along a third axis perpendicular to the first and second axes, and the circuit is further configured to produce a third command when the third signal indicates movement of the body along the third axis.

43. The device of claim 35 wherein the sensor is a micro-electro-mechanical type sensor.

44. A device for user control of a computer system, comprising:
a body;
a sensor coupled to the body and configured to detect a position of the body in a three dimensional space and to produce a corresponding output signal; and
a circuit configured to:
compare first X and Y output signals from the sensor with second X and Y output signals from the sensor and derive a change of position of the body from the first and second X and Y output signals,
determine, from the change of position, a rate of change,
compare the rate of change of position with a rate of change threshold, and,
only if the rate of change does not exceed the rate of change threshold, produce a pointer control signal corresponding to a direction of movement of the body.

45. The device of claim 44 wherein the circuit is configured to compare the amplitude of change with an amplitude threshold and produce the pointer control signal only if the amplitude of change exceeds the amplitude threshold.

46. The device of claim 44 wherein the circuit is configured to produce the pointer control signal to move a screen pointer in a direction corresponding to the direction of movement of the body, and to move the screen pointer at a sped that is directly related to the amplitude of change.

* * * * *

UNITED STATES PATENT AND TRADEMARK OFFICE
CERTIFICATE OF CORRECTION

PATENT NO. : 8,139,031 B2
APPLICATION NO. : 10/685292
DATED : March 20, 2012
INVENTOR(S) : Giuseppe Calarco et al.

Page 1 of 1

It is certified that error appears in the above-identified patent and that said Letters Patent is hereby corrected as shown below:

On the Title page, Item (75):
"Giuseppe Calarco, Singapore (SG); Jean Nguyen, Singapore (SG); Guy Formica, Singapore (SG); Stephane Gervais-Ducouret, Singapore (SG); Fabio Pasolini, S. Martino Siccomario (IL); Paolo Bendiscioli, Pavia (IL)" should read, --Giuseppe Calarco, Singapore (SG); Jean Nguyen, Singapore (SG); Guy Formica, Singapore (SG); Stephane Gervais-Ducouret, Singapore (SG); Fabio Pasolini, S. Martino Siccomario (IT): Paolo Bendiscioli, Pavia (IT)--.

On the Title page, Item (56):
"Lee, S., et al. "Two-Dimensional Position Detection System with MEMS Accelerometer for MOUSE Applications," *Proceedings of the Design Automation Conference*, vol. 38, June 18, 2001, pp. 852-857." should read, --Lee, S., et al., "Two-Dimensional Position Detection System with MEMS Accelerometer for MOUSE Applications," *Proceedings of the Design Automation Conference*, vol. 38, June 18, 2001, pp. 852-857.--.

Column 10, Line 49:
"the body, and to move the screen pointer at a sped that is" should read, --the body, and to move the screen pointer at a speed that is--.

Signed and Sealed this
Twenty-sixth Day of June, 2012

David J. Kappos
*Director of the United States Patent and Trademark Office*